S. Pennock.
Carpet Stretcher.
Nº 85,690. Patented Jan. 5, 1869.

Witnesses:
John A. Ellis
A.S. Worth

Inventor:
Saml. Pennock
Pr. T. H. Alexander

United States Patent Office.

SAMUEL PENNOCK, OF GENEVA, ILLINOIS.

Letters Patent No. 85,690, dated January 5, 1869.

IMPROVED CARPET-STRETCHER.

The Schedule referred to in these Letters Patent and making part of the same.

To all whom it may concern:

Be it known that I, SAMUEL PENNOCK, of Geneva, in the county of Kane, and State of Illinois, have invented certain new and useful Improvements in Carpet-Stretchers; and I do hereby declare that the following is a full, clear, and exact description thereof, reference being had to the accompanying drawings, and to the letters of reference marked thereon, which form a part of this specification, and in which—

Figure 1:
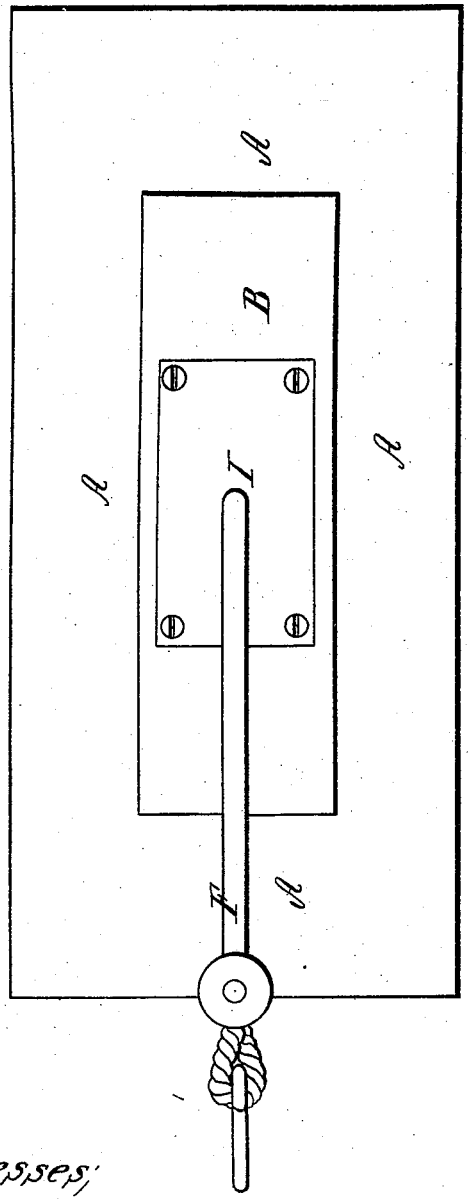

Figure 1 represents a plan view of my carpet-stretcher, and

Figure 2:
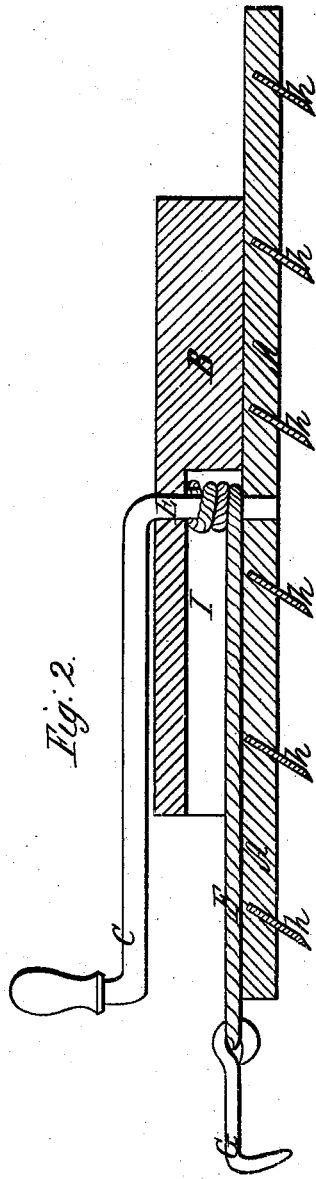

Figure 2, a longitudinal view of the same.

Similar letters indicate like parts in both figures.

My invention relates to improvements in carpet-stretchers, and consists in the employment of a windlass and crank, as the motive-power to stretch said carpet.

To enable others skilled in the art to which my invention appertains, to make and use the same, I will describe its construction and operation.

In the accompanying drawing—

A represents a board or metallic piece, to the lower surface of which are attached metal teeth $h$, for the purpose of holding the board to the carpet.

B is a block, with a cavity, I, in its lower surface, sufficiently large to allow the cord to pass around the windlass.

The cavity I is connected with a channel to admit the cord.

C is a crank, which is provided with a windlass, E, passing through the cavity I into the board A, the crank and windlass being made of one piece, or a common pulley can be attached to the end of the crank inside the cavity.

F is a cord, one end of which is secured to the windlass, and the other end provided with a hook, G, or a pulley may be used in the cavity.

The board A being attached to the carpet by the teeth $h$, it will be observed that when the hook G is secured to the washboard, or some other convenient place, by turning the crank the carpet can be easily stretched.

Having thus fully described my invention,

What I claim as new, and desire to secure by Letters Patent, is—

The combination of the piece A, teeth $h$, windlass E, crank D, cord F, and hook G, as and for the purpose set forth.

In testimony that I claim the foregoing as my own, I affix my signature in presence of two witnesses.

SAM'L PENNOCK.

Witnesses:
HENRY B. PEIRCE,
GEO. W. WATSON.